United States Patent
Nagasaka et al.

(10) Patent No.: US 9,900,910 B2
(45) Date of Patent: Feb. 20, 2018

(54) USER TERMINAL, CELLULAR BASE STATION, AND PROCESSOR FOR CELLULAR AND WLAN COMMUNICATIONS

(71) Applicant: KYOCERA CORPORATION, Kyoto (JP)

(72) Inventors: Yushi Nagasaka, Yokohama (JP); Masato Fujishiro, Yokohama (JP); Kugo Morita, Yokohama (JP); Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 79 days.

(21) Appl. No.: 14/890,048

(22) PCT Filed: May 8, 2014

(86) PCT No.: PCT/JP2014/062368
§ 371 (c)(1),
(2) Date: Nov. 9, 2015

(87) PCT Pub. No.: WO2014/181829
PCT Pub. Date: Nov. 13, 2014

(65) Prior Publication Data
US 2016/0128098 A1  May 5, 2016

(30) Foreign Application Priority Data
May 10, 2013 (JP) .................... 2013-100159

(51) Int. Cl.
*H04B 7/00* (2006.01)
*H04W 74/00* (2009.01)
(Continued)

(52) U.S. Cl.
CPC ......... *H04W 74/006* (2013.01); *H04W 74/04* (2013.01); *H04W 74/0833* (2013.01);
(Continued)

(58) Field of Classification Search
CPC ......... H04W 36/0055; H04W 36/0083; H04W 36/02; H04W 36/24; H04W 36/28
(Continued)

(56) References Cited

U.S. PATENT DOCUMENTS 8,238,305 B2 * 8/2012 Harada ................ H04L 1/1812
370/330
8,428,015 B2 * 4/2013 Bienas ................ H04W 74/006
370/329
(Continued)

FOREIGN PATENT DOCUMENTS

EP  1 973 366 A2  9/2008
JP  2005-536091 A  11/2005
(Continued)

OTHER PUBLICATIONS

Extended European Search Report (EESR) dated Nov. 18, 2016 from corresponding EP Appl No. 14794334.4, 10 pp.
(Continued)

*Primary Examiner* — Dmitry H Levitan
(74) *Attorney, Agent, or Firm* — Studebaker & Brackett PC (57) ABSTRACT

UE 100 receives, when a connection with eNB 200 is established by the UE 100, from the eNB 200, preamble information indicating a random access preamble to be used in a random access procedure when establishing again a connection with the eNB 200. The UE 100 holds, without discarding, the preamble information even when the UE 100 establishes a connection with AP 300 and releases the connection with the eNB 200.

13 Claims, 7 Drawing Sheets

(51) Int. Cl.
- *H04W 74/08* (2009.01)
- *H04W 74/04* (2009.01)
- *H04W 76/02* (2009.01)
- *H04W 76/06* (2009.01)
- *H04W 88/06* (2009.01)
- *H04W 84/04* (2009.01)
- *H04W 84/12* (2009.01)

(52) U.S. Cl.
CPC ......... *H04W 76/02* (2013.01); *H04W 76/028* (2013.01); *H04W 76/06* (2013.01); *H04W 84/042* (2013.01); *H04W 84/12* (2013.01); *H04W 88/06* (2013.01)

(58) Field of Classification Search
USPC .................. 370/310, 328, 329, 331, 349
See application file for complete search history.

(56) References Cited

U.S. PATENT DOCUMENTS

| | | | | |
|---|---|---|---|---|
| 8,442,027 B2* | 5/2013 | Harada | ................ | H04L 1/1812 370/350 |
| 8,493,917 B2* | 7/2013 | Meyer | ................ | H04W 74/006 370/328 |
| 2004/0106430 A1 | 6/2004 | Schwarz et al. | | |
| 2008/0232283 A1 | 9/2008 | Jen | | |
| 2013/0210422 A1* | 8/2013 | Pani | ................ | H04W 8/02 455/423 |
| 2014/0295825 A1* | 10/2014 | Chuang | ................ | H04W 24/04 455/425 |
| 2016/0057669 A1* | 2/2016 | Hong | ................ | H04W 36/0077 370/331 |

FOREIGN PATENT DOCUMENTS

| | | |
|---|---|---|
| JP | 2008-278473 A | 11/2008 |
| WO | 2010/002306 A1 | 1/2010 |
| WO | 2014/175672 A1 | 10/2014 |

OTHER PUBLICATIONS

Ericsson, "On the details of the dedicated preamble at intra-LTE handover," 3GPP TSG-RAN WG 2 #59 Tdoc R2-073238, Athens, Greece, Aug. 2-24, 2007, 3 pp.

3GPP TR 23.890 Vo.4.0, Technical Specification Group Services and System Aspects; Optimized Offloading to WLAN in 3GPP-RAT mobility; (Release 12), Apr. 2013, 12 pp.

3GPP TSG-RAN Meeting #57, RP-1201455, Chicago, USA, Sep. 13-15, 2012, New Study Item Proposal on WLAN/3GPP Radio Interworking.

International Search Report issued in Application No. PCT/JP2014/062368, dated Aug. 12, 2014.

Written Opinion issued in Application No. PCT/JP2014/062368, dated Aug. 12, 2014.

An Office Action; "Notice of Reasons for Rejection," mailed by the Japanese Patent Office dated Aug. 15, 2017, which corresponds to Japanese Patent Application No. 2013-100159 and is related to U.S. Appl. No. 14/890,048; with English language Concise Explanation.

* cited by examiner

USER TERMINAL, CELLULAR BASE STATION, AND PROCESSOR FOR CELLULAR AND WLAN COMMUNICATIONS

TECHNICAL FIELD

The present invention relates to a user terminal used in a cellular communication system capable of cooperating with a wireless LAN system, a cellular base station therefor, and a processor therefor.

BACKGROUND ART

In recent years, a user terminal (so-called dual terminal) including a cellular communication unit and a wireless LAN (WLAN) communication unit becomes widely available. Further, the number of WLAN access points (hereinafter simply referred to as an "access point") managed by an operator of a cellular communication system increases.

Therefore, in 3GPP (3rd Generation Partnership Project) which is a project aiming to standardize a cellular communication system, it is planned to consider a technology capable of strengthening cooperation between a cellular communication system and a WLAN system (see Non Patent Literature 1).

For example, a method may be considered where a traffic exchanged between the user terminal and the cellular base station is transitioned to the WLAN system (that is, offloaded) so as to disperse a traffic load in the cellular base station to the WLAN system.

CITATION LIST

Non Patent Literature

[NPL 1] 3GPP contribution RP-1201455

SUMMARY OF INVENTION

A condition is assumed where a large number of user terminals establish a connection with one access point by the above-described offload and a connection with the cellular base station is not established yet.

In such a condition, when there is a failure in the access point, for example, a large number of user terminals may simultaneously perform a process for establishing a connection (that is, a random access procedure) with the cellular base station.

Here, there is a problem in that when a contention of random access preambles occurs in the random access procedure, a user terminal not capable of establishing a connection with the cellular base station discontinues communication.

Therefore, an object of the present invention is to avoid discontinuation of communication resulting from the contention of random access preambles, when a cellular communication system and a WLAN system are cooperated.

Solution to Problem

A user terminal according to a first aspect supports cellular communication and WLAN communication. The user terminal comprises a receiver configured to receive, when a connection with a cellular base station is established by the user terminal, from the cellular base station, preamble information indicating a random access preamble to be used in a random access procedure when establishing again a connection with the cellular base station; and a controller configured to hold, without discarding, the preamble information even when the user terminal establishes a connection with an access point and releases the connection with the cellular base station.

A cellular base station according to a second aspect establishes a connection with a user terminal. The cellular comprises a controller configured to notify, when a connection with the user terminal is established, the user terminal of preamble information indicating a random access preamble to be used in a random access procedure when the user terminal establishes again the connection with the cellular base station.

A processor according to a third aspect is used in a user terminal supporting cellular communication and WLAN communication. The processor performs the steps of receiving, when a connection with a cellular base station is established by the user terminal, from the cellular base station, preamble information indicating a random access preamble to be used in a random access procedure when establishing again a connection with the cellular base station; and holding, without discarding, the preamble information even when the user terminal establishes a connection with an access point and releases the connection with the cellular base station.

DESCRIPTION OF EMBODIMENTS

Overview of Embodiments

A user terminal according to embodiments supports cellular communication and WLAN communication. The user terminal comprises a receiver configured to receive, when a connection with a cellular base station is established by the user terminal, from the cellular base station, preamble information indicating a random access preamble to be used in a random access procedure when establishing again a connection with the cellular base station; and a controller configured to hold, without discarding, the preamble information even when the user terminal establishes a connection with an access point and releases the connection with the cellular base station.

In the embodiments, the controller uses, when establishing a connection again with the cellular base station after releasing the connection with the cellular base station, the random access preamble indicated by the held preamble information to perform the random access procedure.

In the embodiments, the user terminal is assigned, from the cellular base station, with the random access preamble different from that of another user terminal that establishes a connection with the cellular base station.

In the embodiments, the user terminal is assigned, from the cellular base station, with the random access preamble different from that of another user terminal that establishes a connection with the access point.

In the embodiments, the user terminal is assigned, from the cellular base station, with the random access preamble included in a contention-based random access preamble group.

In the embodiments, the controller discards the held preamble information when a predetermined time passes since establishing a connection with the access point or when establishing a connection with a cellular base station different from the cellular base station.

In the embodiments, the user terminal further comprises a transmitter configured to transmit, to the cellular base station, a notification related to a WLAN communication capability of the user terminal or a WLAN on/off state. The receiver receives the preamble information transmitted, on the basis of the notification, from the cellular base station.

In the embodiments, the preamble information is included in a connection instruction that is transmitted from the cellular base station and that instructs a connection to the access point.

A cellular base station according to the embodiments establishes a connection with a user terminal. The cellular base station comprises a controller configured to notify, when a connection with the user terminal is established, the user terminal of preamble information indicating a random access preamble to be used in a random access procedure when the user terminal establishes again the connection with the cellular base station.

In the embodiments, the controller assigns the random access preamble differently for each user terminal that has established a connection with the cellular base station.

In the embodiments, the controller assigns the random access preamble differently for each user terminal that has established a connection with an identical access point.

In the embodiments, the controller assigns the random access preamble included in a contention-based random access preamble group.

In the embodiments, the controller assigns the random access preamble included in a non-contention-based random access preamble group. The controller does not assign, to another user terminal, a random access preamble assigned to the user terminal but keeps the random access preamble assigned to the user terminal until a predetermined time passes since notifying the user terminal of the preamble information or a predetermined time passes since releasing the connection with the user terminal.

In the embodiments, it further comprises a receiver configured to receive, from the user terminal, a notification related to a WLAN communication capability of the user terminal or a WLAN on/off state. The controller notifies the user terminal of the preamble information, on the basis of the notification.

In the embodiments, the controller notifies the user terminal of the preamble information that is included in a connection instruction that instructs a connection to the access point.

A processor according to the embodiments is used in a user terminal supporting cellular communication and WLAN communication. The processor performs the steps of receiving, when a connection with a cellular base station is established by the user terminal, from the cellular base station, preamble information indicating a random access preamble to be used in a random access procedure when establishing again a connection with the cellular base station; and holding, without discarding, the preamble information even when the user terminal establishes a connection with an access point and releases the connection with the cellular base station.

Embodiment

Below, with reference to the drawing, an embodiment will be described in which a cellular communication system (LTE system) configured to comply with the 3GPP standards is cooperated with a wireless LAN (WLAN) system.

(System Configuration)

Figure 1:
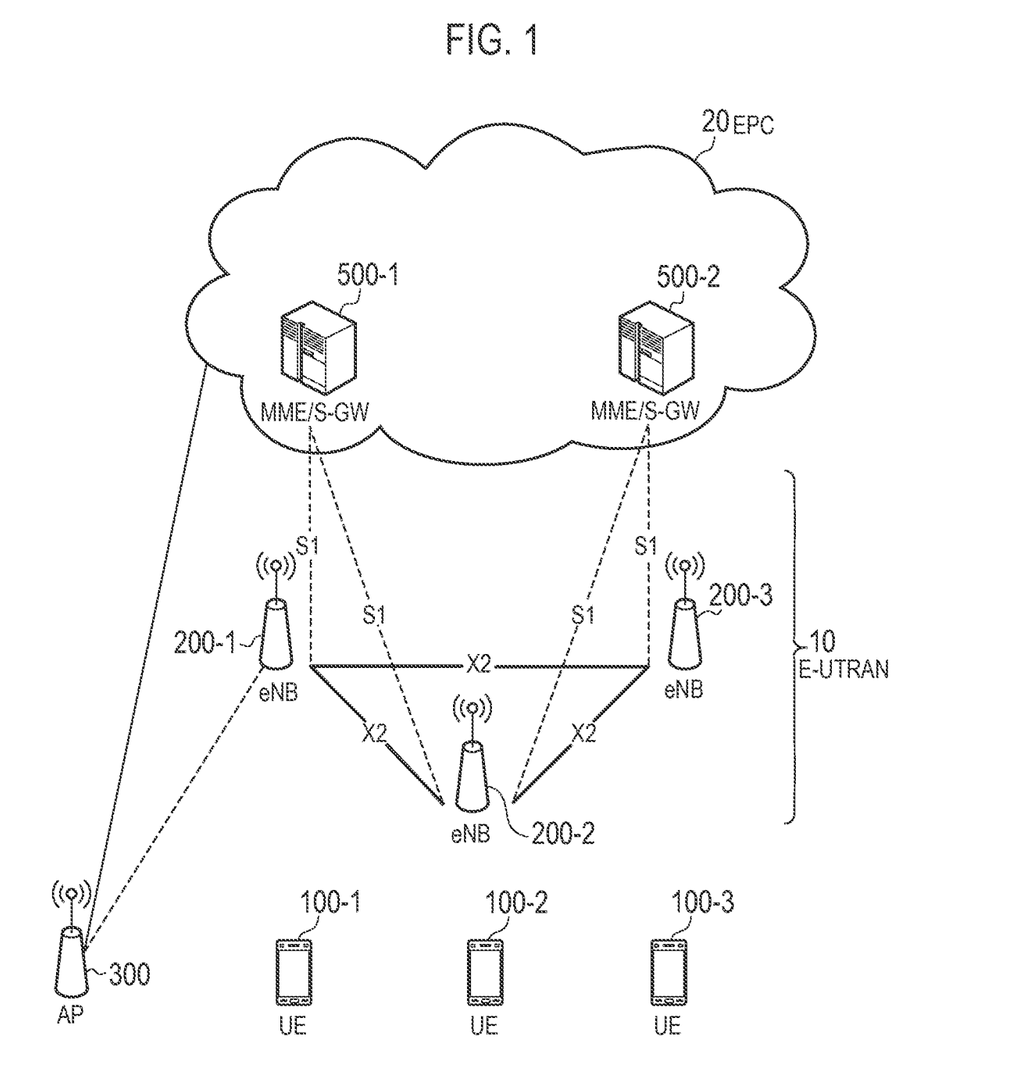
FIG. 1 is a system configuration diagram according to an embodiment.

FIG. 1 is a system configuration diagram according to the present embodiment. As shown in FIG. 1, a cellular communication system includes a plurality of UEs (User Equipments) 100, an E-UTRAN (Evolved-UMTS Terrestrial Radio Access Network) 10, and an EPC (Evolved Packet Core) 20. The E-UTRAN 10 corresponds to a radio access network. The EPC 20 corresponds to a core network.

The UE 100 is a mobile-type radio communication device and performs radio communication with a cell with which a connection is established. The UE 100 corresponds to a user terminal. The UE 100 is a terminal (dual terminal) that supports both communication schemes of cellular communication and WLAN communication.

The E-UTRAN 10 includes a plurality of eNBs 200 (evolved Node-Bs). The eNB 200 corresponds to a cellular base station. The eNB 200 manages one or a plurality of cells, and performs radio communication with the UE 100 with which a connection is established with a cell of the eNB 200. It is noted that the "cell" is used as a term indicating a minimum unit of a radio communication area, and is also used as a term indicating a function of performing radio communication with the UE 100. Further, the eNB 200 has a radio resource management (RRM) function, a routing function of user data, and a measurement control function for mobility control and scheduling, for example.

The eNBs 200 are connected mutually via an X2 interface. Further, the eNB 200 is connected via an S1 interface to an MME/S-GW 500 included in the EPC 20.

The EPC 20 includes a plurality of MMEs (Mobility Management Entities)/S-GWs (Serving-Gateways) 500. The MME is a network node that performs various mobility controls, etc., on the UE 100, and corresponds to a control station. The S-GW is a network node that performs control to transfer user data and corresponds to a mobile switching center.

The WLAN system includes a WLAN access point (hereinafter, "AP") 300. The WLAN system is configured to comply with various IEEE 802.11 specifications, for example. The AP 300 communicates with the UE 100 in a frequency band (WLAN frequency band) different from a cellular frequency band. The AP 300 is connected, via a router, etc., to the EPC 20.

Further, in addition to a case where the eNB 200 and the AP 300 are individually located, the eNB 200 and the AP 300 may also be "Collocated". As one mode of the "Collocated", the eNB 200 and the AP 300 may be directly connected to each other through any interface of an operator.

Next, configurations of the UE 100, the eNB 200, and the AP 300 will be described.

Figure 2:
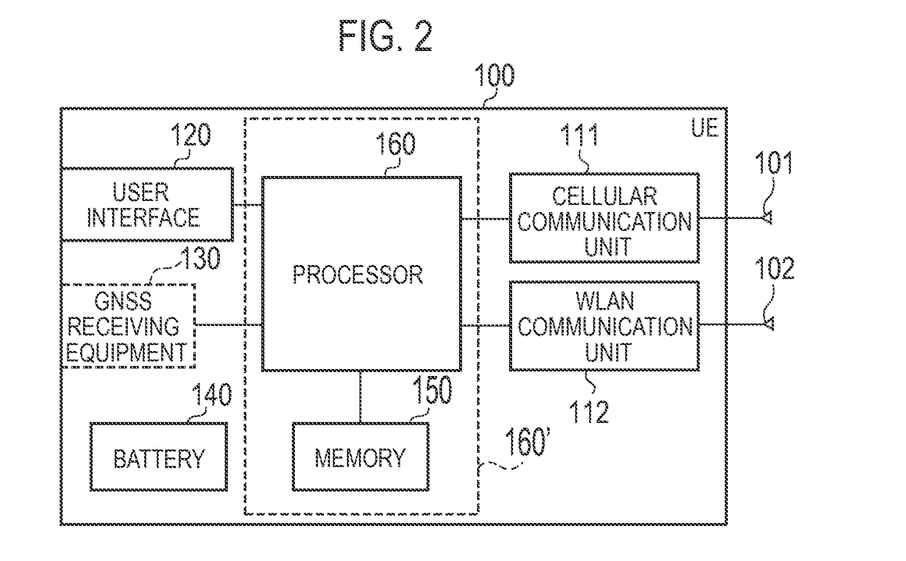
FIG. 2 is a block diagram of a UE (user terminal) according to the embodiment.

FIG. 2 is a block diagram of the UE 100. As shown in FIG. 2, the UE 100 includes: antennas 101 and 102; a cellular communication unit 111; a WLAN communication unit 112; a user interface 120; a GNSS (Global Navigation Satellite System) receiving equipment 130; a battery 140; a memory 150; and a processor 160. The memory 150 and the processor 160 configure a controller. The UE 100 may not necessarily have the GNSS receiving equipment 130. Furthermore, the memory 150 may be integrally formed with the processor 160, and this set (that is, a chip set) may be called a processor 160'.

The antenna 101 and the cellular communication unit 111 are used for exchanging a cellular radio signal. The cellular communication unit 111 converts a baseband signal output from the processor 160 into the cellular radio signal, and transmits the same from the antenna 101. Further, the cellular communication unit 111 converts the cellular radio signal received by the antenna 101 into the baseband signal, and outputs the same to the processor 160.

The antenna 102 and the WLAN communication unit 112 are used for transmitting and receiving the WLAN radio signal. The WLAN communication unit 112 converts the baseband signal output from the processor 160 into the WLAN radio signal and transmits the same from the antenna 102. Further, the WLAN communication unit 112 converts the WLAN radio signal received by the antenna 102 into the baseband signal and outputs the same to the processor 160.

The user interface 120 is an interface with a user carrying the UE 100, and includes, for example, a display, a microphone, a speaker, various buttons and the like. Upon receipt of the input from a user, the user interface 120 outputs a signal indicating a content of the input to the processor 160. The GNSS receiving equipment 130 receives a GNSS signal in order to obtain location information indicating a geographical location of the UE 100, and outputs the received signal to the processor 160. The battery 140 accumulates power to be supplied to each block of the UE 100.

The memory 150 stores a program to be executed by the processor 160 and information to be used for a process by the processor 160. The processor 160 includes a baseband processor that performs modulation and demodulation, encoding and decoding and the like on the baseband signal and a CPU that performs various processes by executing the program stored in the memory 150. The processor 160 may further include a codec that performs encoding and decoding on sound and video signals. The processor 160 executes various types of processes and various types of communication protocols described later.

Figure 3:
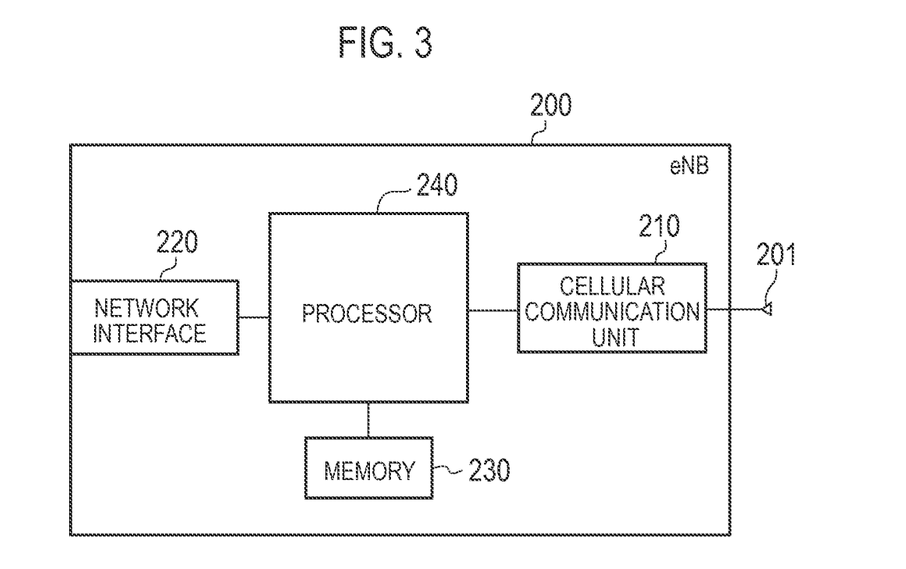
FIG. 3 is a block diagram of an eNB (cellular base station) according to the embodiment.

FIG. 3 is a block diagram of the eNB 200. As shown in FIG. 3, the eNB 200 includes an antenna 201, a cellular communication unit 210, a network interface 220, a memory 230, and a processor 240. The memory 230 and the processor 240 configure a controller.

The antenna 201 and the cellular communication unit 210 are used for exchanging a cellular radio signal. The cellular communication unit 210 converts the baseband signal output from the processor 240 into the cellular radio signal, and transmits the same from the antenna 201. Furthermore, the cellular communication unit 210 converts the cellular radio signal received by the antenna 201 into the baseband signal, and outputs the same to the processor 240.

The network interface 220 is connected to a neighboring eNB 200 via an X2 interface and is connected to the MME/S-GW 500 via the S1 interface. Further, the network interface 220 is used for communication with the AP 300 via the EPC 20.

The memory 230 stores a program to be executed by the processor 240 and information to be used for a process by the processor 240. The processor 240 includes a baseband processor that performs modulation and demodulation, encoding and decoding and the like on the baseband signal and a CPU that performs various types of processes by executing the program stored in the memory 230. The processor 240 executes various types of processes and various types of communication protocols described later.

Figure 4:
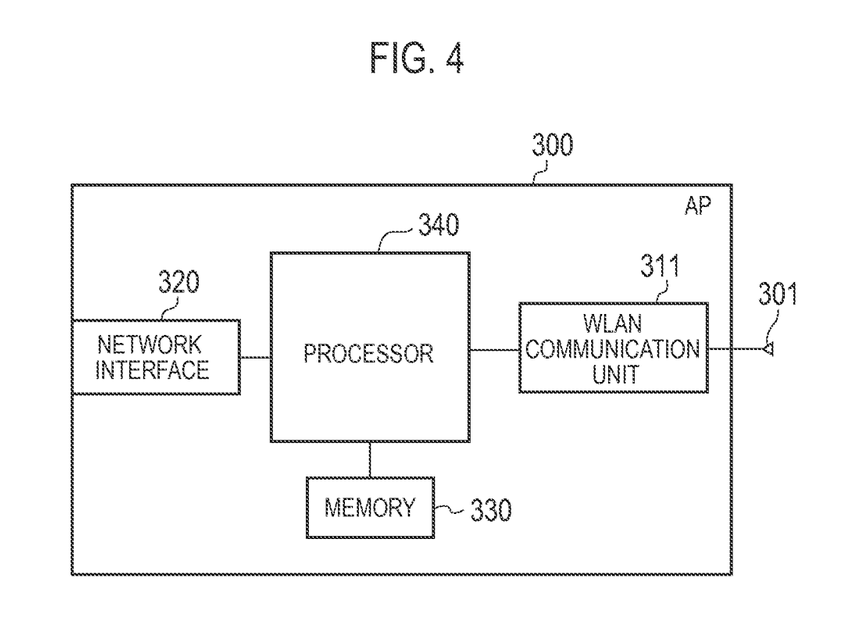
FIG. 4 is a block diagram of an AP (access point) according to the embodiment.

FIG. 4 is a block diagram of the AP 300. As shown in FIG. 4, the AP 300 includes an antenna 301, a WLAN communication unit 311, a network interface 320, a memory 330, and a processor 340.

The antenna 301 and the WLAN communication unit 311 are used for transmitting and receiving the WLAN radio signal. The WLAN communication unit 311 converts the baseband signal output from the processor 340 into the WLAN radio signal and transmits the same from the antenna 301. Further, the WLAN communication unit 311 converts the WLAN radio signal received by the antenna 301 into the baseband signal and outputs the same to the processor 340.

The network interface 320 is connected to the EPC 20 via a router, etc. Further, the network interface 320 is used for communication with the eNB 200 via the EPC 20.

The memory 330 stores a program to be executed by the processor 340 and information to be used for a process by the processor 340. The processor 340 includes a baseband processor that performs modulation and demodulation, encoding and decoding and the like on the baseband signal and a CPU that performs various processes by executing the program stored in the memory 330.

Figure 5:
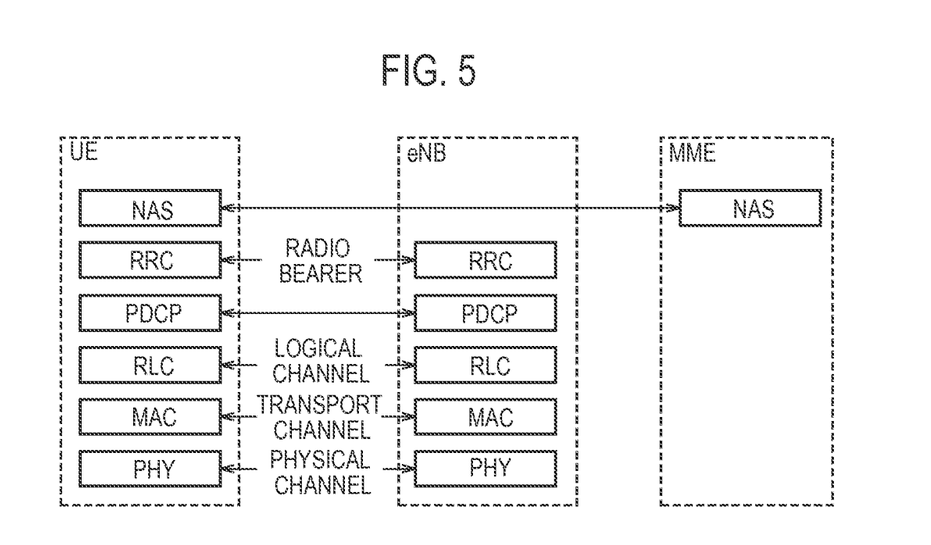
FIG. 5 is a protocol stack diagram of a radio interface in an LTE system.

FIG. 5 is a protocol stack diagram of a radio interface in the cellular communication system. As shown in FIG. 5, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, data is transmitted via the physical channel.

The MAC layer performs priority control of data, a retransmission process by hybrid ARQ (HARQ), and the like. Between the MAC layer of the UE 100 and the MAC layer of the eNB 200, data is transmitted via a transport channel. The MAC layer of the eNB 200 includes a scheduler that selects a transport format (a transport block size, a modulation and coding scheme and the like) of an uplink and a downlink, and an assigned resource block.

The RLC layer uses the functions of the MAC layer and the physical layer to transmit data to an RLC layer at a reception side. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of configurations is transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in a connected state (RRC connected state), otherwise, the UE 100 is in an idle state (RRC idle state).

A NAS (Non-Access Stratum) layer positioned above the RRC layer performs a session management, a mobility management and the like.

Figure 6:
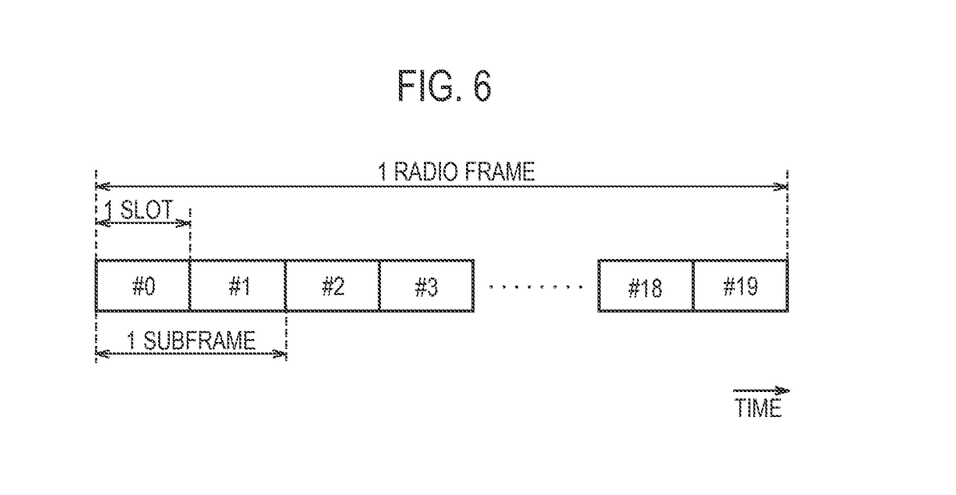
FIG. 6 is a configuration diagram of a radio frame used in the LTE system.

FIG. 6 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As shown in FIG. 6, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction.

Among radio resources assigned to the UE 100, a frequency resource can be specified by a resource block and a time resource can be specified by a subframe (or slot).

In the downlink, an interval of several symbols at the head of each subframe is a control region mainly used as a physical downlink control channel (PDCCH). Furthermore, the remaining interval of each subframe is a region that can be mainly used as a physical downlink shared channel (PDSCH). Furthermore, in the downlink, reference signals such as cell-specific reference signals are distributed and arranged in each subframe.

In the uplink, both ends in the frequency direction of each subframe are control regions mainly used as a physical uplink control channel (PUCCH). Furthermore, the center portion in the frequency direction of each subframe is a region that can be mainly used as a physical uplink shared channel (PUSCH).

(Random Access Procedure)

Here, a general random access procedure in the LTE will be described. The UE 100 performs the random access procedure for transitioning from a state (idle state) where the connection to the eNB 200 is not established to a state (connected state) where the connection to the eNB 200 is established.

Prior to the random access procedure, the UE 100 uses a cell search to establish a downlink synchronization with the eNB 200. Then, the UE 100 receives and decodes the broadcast information (MIB and SIB) from the eNB 200, and starts the random access procedure to establish the uplink synchronization.

As a first process, the UE 100 transmits a random access preamble to the eNB 200 over a random access channel (RACH). The RACH is mapped onto a physical random access channel (PRACH).

It is noted that the eNB 200 transmits by broadcast (transmits by SIB2, for example) information on a resource (random access resource) available for transmitting the random access preamble. The UE 100 uses the random access resource selected from available random access resources to transmit the random access preamble. The random access resource includes a preamble sequence. The preamble sequence is defined by a combination of two parameters (ra-PreambleIndex, ra-PRACH-MaskIndex).

It is noted that the random access preamble notified by the SIB2 is a contention-based random access preamble (group). The contention-based random access preamble is not assigned exclusively for the UE 100, but any random access preamble may be selected and used by the UE 100 from among the random access preamble group. On the other hand, during handover, a non-contention-based random access preamble (group) is used. The non-contention-based random access preamble is assigned exclusively for the UE 100 that performs handover, and thus, no contention occurs.

As a second process, after receiving the random access preamble from the UE 100, the eNB 200 performs delay estimation between the UE 100 and the eNB 200 on the basis of the random access preamble and determines a radio resource to be assigned to the UE 100. Then, the eNB 200 transmits a random access response as a response to the random access preamble to the UE 100 over the DL-SCH. The random access response includes a timing correction value based on a result of the delay estimation and information on the determined assigned resource.

As a third process, after receiving the random access response from the eNB 200, the UE 100 transmits a connection establishment request (RRC Connection Request) to the eNB 200 over the CCCH by using the resource indicated by the random access response. The connection establishment request includes identification information (temporary identifier) of the UE 100.

As a fourth process, after receiving the connection establishment request from the UE 100, the eNB 200 transmits a connection establishment response as a response for the connection establishment request to the UE 100 over the CCCH. The connection establishment response is an acknowledgment (RRC Connection Setup) or a negative acknowledgment (RRC Connection Reject). The connection establishment response includes the identification information of the UE 100 as a transmission destination. The UE 100 checks whether or not the UE identification information included in the connection establishment response matches the UE identification information transmitted from the UE 100. When the UE identification information matches each other, the UE 100 determines that the connection establishment response is addressed to the UE 100 and the connection establishment with the eNB 200 is completed.

In the above-described first process, when the plurality of UEs 100 transmit the random access preamble by the same random access resource (the preamble sequence), access contention occurs. In this case, since the plurality of UEs 100 respond to the random access response transmitted from the eNB 200, a collision occurs. The UE 100 in which such a collision occurs is not capable of establishing a connection with the eNB 200, and thus, performs the random access procedure again.

(Operation According to Embodiment)

Next, an operation according to the embodiment will be described.

(1) Operation Environment

Figure 7:
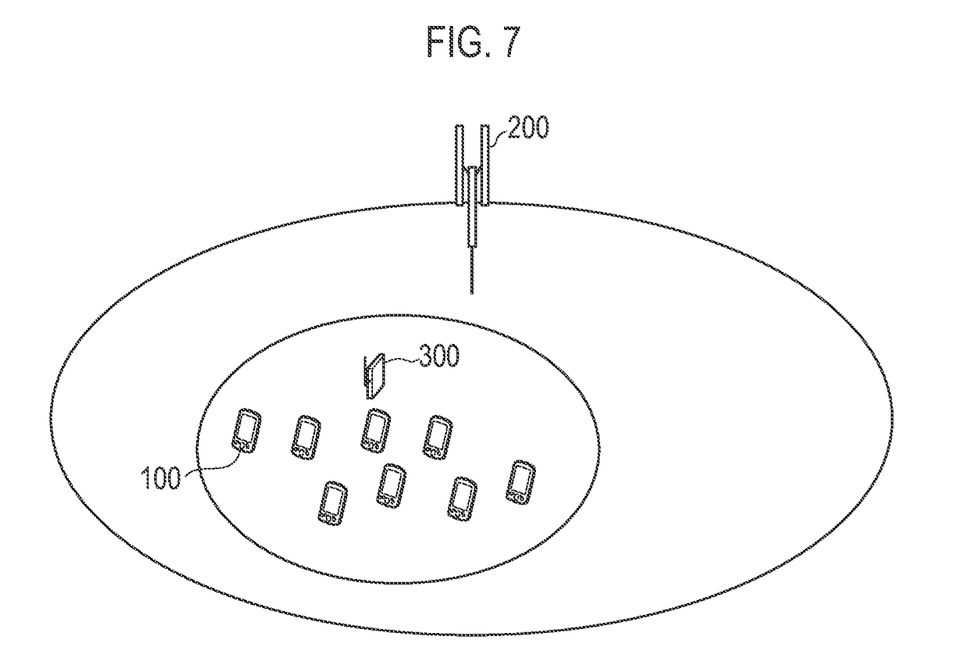
FIG. 7 is a diagram for describing an operation environment according to the embodiment.

FIG. 7 is a diagram for explaining an operation environment according to the embodiment. As shown in FIG. 7, the AP 300 is provided in a coverage of the eNB 200. The AP 300 is an AP (Operator controlled AP) managed by an operator.

Further, a plurality of UEs 100 are located in the coverage of the eNB 200 and in the coverage of the AP 300. The UE 100 establishes a connection with the eNB 200, and performs cellular communication with the eNB 200. Specifically, the UE 100 exchanges a cellular radio signal including a traffic (user data) with the eNB 200.

When the eNB 200 establishes a connection with a large number of UEs 100, a load level of the eNB 200 increases. The "load level" means the degree of congestion in the eNB 200 such as a traffic load of the eNB 200 or usage of radio resources of the eNB 200. Here, at least a part of traffic exchanged between the UE 100 and the eNB 200 is allowed to transition (offload) to the WLAN system, so that it is possible to disperse a traffic load of the eNB 200 to the WLAN system.

Therefore, the UE 100 or the eNB 200 determines to perform offload to the AP 300, and switches the connection by the UE 100 from the eNB 200 to the AP 300. This results in a condition (idle state) where a plurality of UEs 100 establish a connection with the AP 300 and do not establish a connection with the eNB 200.

In such a condition, when there is a failure in the AP 300, for example, a plurality of UEs 100 may simultaneously perform the above-described random access procedure in order to establish a connection with the eNB 200. Here, as a result of a contention of random access preambles occurring in the random access procedure, the UE 100 not capable of establishing a connection with the eNB 200 discontinues communication.

Therefore, an operation sequence according to an embodiment will be described below which is to avoid discontinuation of communication resulting from such a contention of random access preambles.

(2) Operation Sequence

Next, an operation sequence according to the embodiment will be described in order of operation patterns 1 and 2.

The operation pattern 1 is an operation pattern in a case where the offload is started based on the UE 100, and the eNB 200 is not capable of grasping a timing at which the UE 100 starts connection with the AP 300, for example.

On the other hand, the operation pattern 2 is an operation pattern in a case where the offload is started based on the eNB 200, and the eNB 200 is capable of grasping a timing at which the UE 100 starts connection with the AP 300, for example.

(2.1) Operation Pattern 1

Figure 8:
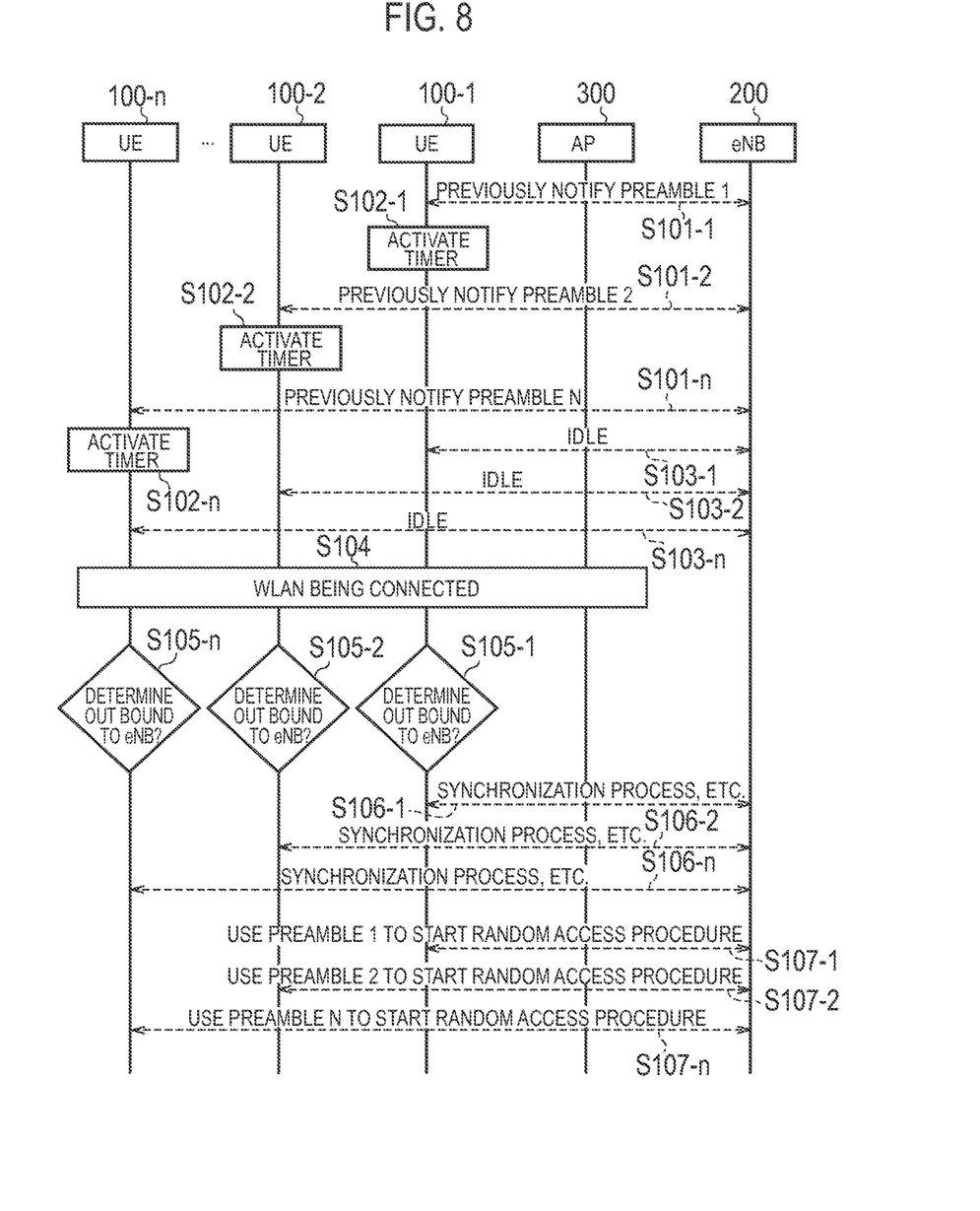
FIG. 8 is a sequence diagram of an operation pattern 1 according to the embodiment.

FIG. 8 is a sequence diagram of the operation pattern 1 according to the embodiment. In an initial state of the sequence, a plurality of UEs 100 (UEs 100-1 to UE 100-*n*) are in a state (connected state) of establishing a connection with the eNB 200 and the WLAN communication unit 112 is in an on state.

As shown in FIG. 8, in step S101-1, the processor 240 of the eNB 200 notifies the UE 100-1 by the cellular communication unit 210 of preamble information indicating a random access preamble to be used for the random access procedure when the UE 100-1 establishes again a connection with the eNB 200. The preamble information includes two parameters (ra-PreambleIndex, ra-PRACH-MaskIndex) defining a preamble sequence. The preamble information is notified by a UE specific message (RRC message, for example) to the UE 100-1 from the eNB 200.

In the operation pattern 1, a notification trigger for the preamble information is any one of: the UE 100-1 completing a connection establishment with the eNB 200 or the UE 100-1 executing handover to the eNB 200; and a message for network selection being transmitted from the eNB 200 to the UE 100-1, for example.

In the operation pattern 1, the UE 100-1 is assigned, from the eNB 200, with a random access preamble different from that of another UE 100 that establishes a connection with the eNB 200. That is, the processor 240 of the eNB 200 assigns a random access preamble differently for each UE 100 that has established a connection with the eNB 200. The different random access preamble is a random access preamble formed of a preamble sequence in which at least one of the ra-PreambleIndex and the ra-PRACH-MaskIndex is different.

In the operation pattern 1, the eNB 200 assigns the random access preamble included in the contention-based random access preamble group, to the UE 100-1. However, as described later, the random access preamble included in the non-contention-based random access preamble group may be assigned to the UE 100-1.

The cellular communication unit 111 of the UE 100 receives the preamble information. The processor 160 stores the preamble information received by the cellular communication unit 111, into the memory 150.

In step S102-1, the processor 160 of the UE 100 activates a timer for clocking a period during which to hold the preamble information. The processor 160 activates the timer when starting an offload to the AP 300.

In step S103-1, the processor 160 of the UE 100 starts the offload, establishes a connection by the WLAN communication unit 112 with the AP 300, and releases the connection with the eNB 200. As a result, the UE 100 transitions from the connected state of the cellular communication to the idle state. Here, the processor 160 of the UE 100 holds, without discarding, the preamble information stored in the memory 150 even when the UE 100 establishes a connection with the AP 300 and releases the connection with the eNB 200.

Further, in steps S101-2 to S103-2, the UE 100-2 operates in much the same way as the UE 100-1 does. In steps S101-*n* to S103-*n*, the UE 100-*n* operates in much the same way as the UE 100-1 does.

In step S104, the UEs 100-1 to 100-*n* perform the WLAN communication, by the connection with the AP 300, with the AP 300.

In step S105-1, the processor 160 of the UE 100-1 determines to switch a connection to the eNB 200 (that is, outbound from the AP 300). Further, in step S105-2, the processor 160 of the UE 100-2 determines to switch a connection to the NB 200. In step S105-*n*, the processor 160 of the UE 100-*n* determines to switch a connection to the eNB 200.

In step S106-1, the processor 160 of the UE 100-1 establishes, by the cellular communication unit 111, a downlink synchronization with the eNB 200. Further, in step S106-2, the processor 160 of the UE 100-2 establishes, by the cellular communication unit 111, a downlink synchronization with the eNB 200. In step S106-*n*, the processor 160 of the UE 100-*n* establishes, by the cellular communication unit 111, a downlink synchronization with the eNB 200.

In step S107-1, when establishing again a connection with the eNB 200, the processor 160 of the UE 100-1 uses the random access preamble indicated by the preamble information held in the memory 150 to perform the random access procedure.

Further, in step S107-2, when establishing again a connection with the eNB 200, the processor 160 of the UE 100-2 uses the random access preamble indicated by the preamble information held in the memory 150 to perform the random access procedure.

In step S107-*n*, when establishing again a connection with the eNB 200, the processor 160 of the UE 100-*n* uses the random access preamble indicated by the preamble information held in the memory 150 to perform the random access procedure.

As a result, it is possible to avoid a case where the random access preambles coincide with one another in the UEs 100-1 to 100-*n* and prevent discontinuation of communication resulting from a contention of random access preambles.

It is noted that each of the UEs 100-1 to 100-*n* may discard the held preamble information when a predetermined time passes since the establishment of connection with the AP 300 (that is, when the timer expires) or when a connection is established with an eNB 200 different from the eNB 200.

(2.2) Operation Pattern 2

Figure 9:
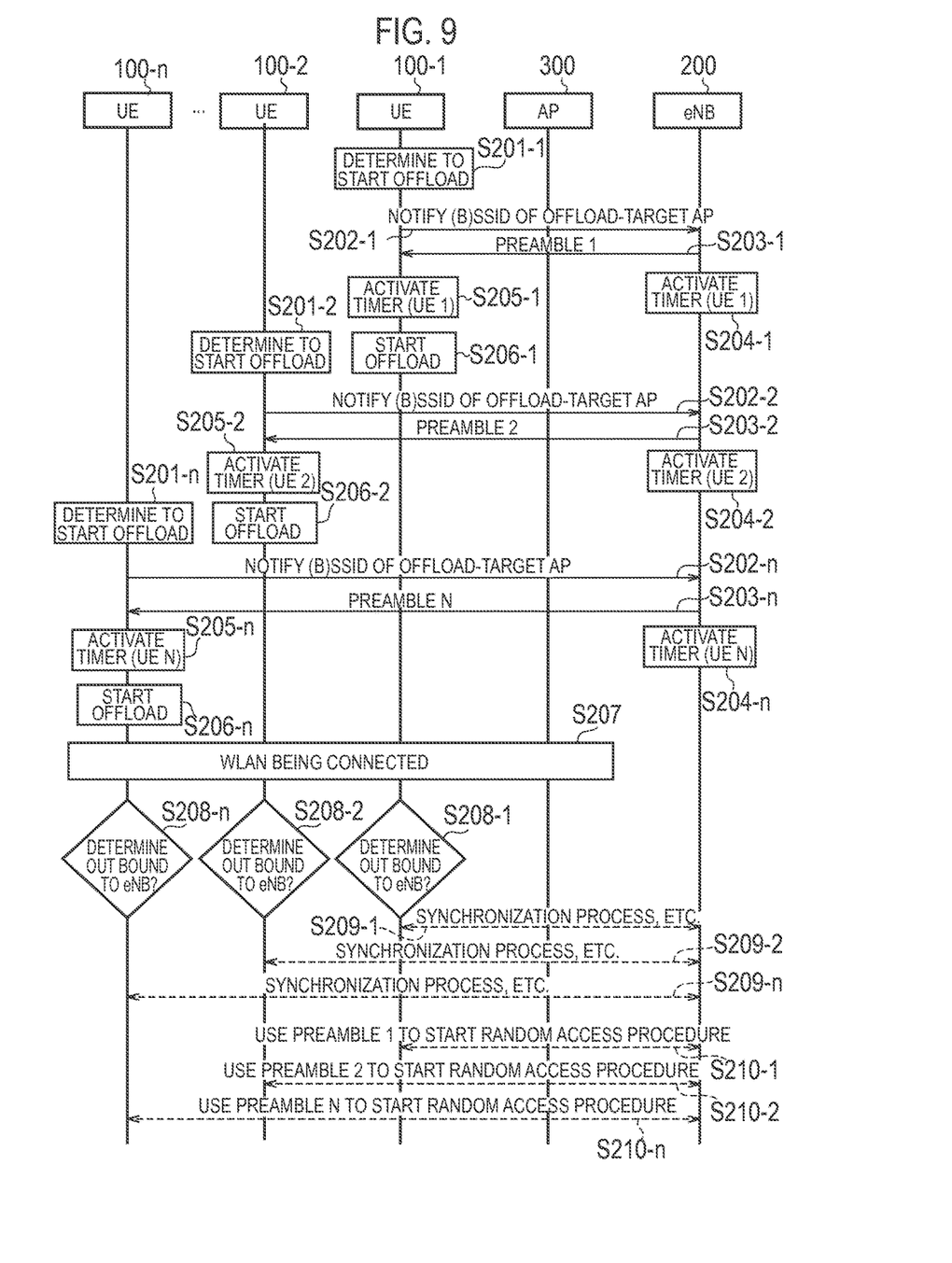
FIG. 9 is a sequence diagram of an operation pattern 2 according to the embodiment.

FIG. 9 is a sequence diagram of the operation pattern 2 according to the embodiment. In an initial state of the sequence, a plurality of UEs 100 (UEs 100-1 to UE 100-*n*) are in a state (connected state) of establishing a connection with the eNB 200 and the WLAN communication unit 112 is in an on state.

As shown in FIG. 9, in step S201-1, the processor 160 of the UE 100-1 determines to start an offload to the AP 300. However, the eNB 200 may determine to start the offload.

In step S202-1, the processor 160 of the UE 100-1 notifies the eNB 200, by the cellular communication unit 111, of an identifier (SSID or BSSID) of the AP 300 to which the traffic is offloaded. The cellular communication unit 210 of the eNB 200 receives the identifier of the AP 300 to which the traffic is offloaded.

In step S203-1, the processor 240 of the eNB 200 notifies the UE 100-1, by the cellular communication unit 210, of preamble information indicating a random access preamble to be used for the random access procedure when the UE 100-1 establishes again a connection with the eNB 200. The preamble information includes two parameters (ra-PreambleIndex, ra-PRACH-MaskIndex) defining a preamble sequence. The preamble information is notified by a UE specific message (RRC message, for example) to the UE 100-1 from the eNB 200. The preamble information may be included in a connection instruction that is transmitted from the eNB 200 and that instructs a connection to the AP 300.

In the operation pattern 2, a notification trigger for the preamble information is determination to start of the offload to the AP 300, for example.

In the operation pattern 2, the UE 100-1 is assigned, from the eNB 200, with a random access preamble different from that of another UE 100 that establishes a connection with the AP 300. That is, the processor 240 of the eNB 200 assigns a random access preamble differently for each UE 100 that has established a connection with an identical AP 300. The different random access preamble is a random access preamble formed of a preamble sequence in which at least one of the ra-PreambleIndex and the ra-PRACH-MaskIndex is different.

In the operation pattern 2, the eNB 200 assigns the random access preamble included in the non-contention-based random access preamble group, to the UE 100-1. However, as described before, the eNB 200 may assign the random access preamble included in the contention-based random access preamble group to the UE 100-1.

In step S204-1, the processor 240 of the eNB 200 does not assign, to another UE 100, the (non-contention based) random access preamble assigned to the UE 100-1, but activates a timer for clocking a period in which the random access preamble should be kept. A timing at which the timer is activated may be a timing at which the preamble information is notified to the UE 100-1 and an offload start timing (connection release timing of the UE 100-1) of the UE 100-1. It is noted that when the timer expires or when the (non-contention based) random access preamble is received from the UE 100-1, the eNB 200 releases the (non-contention based) random access preamble kept in the UE 100-1.

The cellular communication unit 111 of the UE 100 receives the preamble information. The processor 160 stores the preamble information received by the cellular communication unit 111, into the memory 150.

In step S205-1, the processor 160 of the UE 100 activates a timer for clocking a period during which to hold the preamble information. The processor 160 activates the timer when starting an offload to the AP 300.

In step S206-1, the processor 160 of the UE 100 starts the offload, establishes a connection by the WLAN communication unit 112 with the AP 300, and releases the connection with the eNB 200. As a result, the UE 100 transitions from the connected state of the cellular communication to the idle state. Here, the processor 160 of the UE 100 holds, without discarding, the preamble information stored in the memory 150 even when the UE 100 establishes a connection with the AP 300 and releases the connection with the eNB 200.

Further, in steps S201-2 to S206-2, the UE 100-2 (and eNB 200) operates in much the same way as the UE 100-1 does. In steps S201-*n* to S203-*n*, the UE 100-*n* (and eNB 200) operates in much the same way as the UE 100-1 does.

In step S207, the UEs 100-1 to 100-*n* perform the WLAN communication, by the connection with the AP 300, with the AP 300.

In step S208-1, the processor 160 of the UE 100-1 determines to switch a connection to the eNB 200 (that is, outbound from the AP 300). Further, in step S208-2, the processor 160 of the UE 100-2 determines to switch a connection to the NB 200. In step S208-*n*, the processor 160 of the UE 100-*n* determines to switch a connection to the eNB 200.

In step S209-1, the processor 160 of the UE 100-1 establishes, by the cellular communication unit 111, a downlink synchronization with the eNB 200. Further, in step S209-2, the processor 160 of the UE 100-2 establishes, by the cellular communication unit 111, a downlink synchronization with the eNB 200. In step S209-*n*, the processor 160 of the UE 100-*n* establishes, by the cellular communication unit 111, a downlink synchronization with the eNB 200.

In step S210-1, when establishing again a connection with the eNB 200, the processor 160 of the UE 100-1 uses the random access preamble indicated by the preamble information held in the memory 150 to perform the random access procedure.

Further, in step S210-2, when establishing again a connection with the eNB 200, the processor 160 of the UE 100-2 uses the random access preamble indicated by the preamble information held in the memory 150 to perform the random access procedure.

In step S210-*n*, when establishing again a connection with the eNB 200, the processor 160 of the UE 100-*n* uses the random access preamble indicated by the preamble information held in the memory 150 to perform the random access procedure.

As a result, it is possible to avoid a case where the random access preambles coincide with one another in the UEs 100-1 to 100-*n* and prevent discontinuation of communication resulting from a contention of random access preambles.

It is noted that each of the UEs 100-1 to 100-*n* may discard the held preamble information when a predetermined time passes since the establishment of connection with the AP 300 (that is, when the timer expires) or when a connection is established with an eNB 200 different from the eNB 200.

(Conclusion of Embodiment)

The UE 100 according to the embodiment, when the connection with the eNB 200 is established by the UE 100, receives, from the eNB 200, the preamble information indicating the random access preamble to be used in the random access procedure when a connection with the eNB 200 is established again. Even when the UE 100 establishes the connection with the AP 300 and releases the connection with the eNB 200, the UE 100 holds, without discarding, the preamble information.

Thus, in the random access procedure when establishing the connection again with the eNB 200, the UE 100 is capable of using the random access preamble previously designated from the eNB 200 rather than the random access preamble selected by the UE 100 itself. Therefore, it is possible to avoid a case where the random access preambles coincide among the UEs 100 and prevent discontinuation of communication resulting from a contention of random access preambles.

In the operation pattern 1 of the embodiment, the UE 100 is assigned, from the eNB 200, with a random access preamble different from that of another UE 100 that establishes a connection with the eNB 200. That is, the eNB 200 assigns a random access preamble differently for each UE 100 that has established a connection with the eNB 200.

In the operation pattern 2 of the embodiment, the UE 100 is assigned, from the eNB 200, with a random access preamble different from that of another UE 100 that establishes a connection with the AP 300. That is, the eNB 200 assigns a random access preamble differently for each UE 100 that has established a connection with an identical AP 300.

Thus, it is possible to more surely avoid the contention of random access preambles.

In the operation pattern 1 of the embodiment, the UE 100 is assigned, from the eNB 200, with the random access preamble included in the contention-based random access preamble group. As a result, it is possible to keep the non-contention-based random access preamble group for the handover among the eNBs 200.

In the operation pattern 2 of the embodiment, the UE 100 is assigned, from the eNB 200, with the random access preamble included in the non-contention-based random access preamble group. The eNB 200 does not assign the random access preamble assigned to the UE 100 to another UE 100 but keeps the random access preamble until a predetermined time passes since the preamble information is notified to the UE 100. As a result, it is possible to more surely avoid the contention of random access preambles.

In the operation pattern 2 of the embodiment, the preamble information is included in a connection instruction that is transmitted from the eNB 200 and that instructs a connection to the AP 300. As a result, the UE 100 that connects with the AP 300 is capable of acquiring the preamble information.

In the embodiment, when a predetermined time passes since the establishment of connection with the AP 300 or when a connection is established with eNB 200 different from the eNB 200, the UE 100 discards the held preamble information. As a result, it is possible to discard the preamble information at an appropriate timing.

Modification

In the above-described embodiment, a case is assumed where the UE 100 supports the WLAN communication and the WLAN communication unit 112 is in an on state. However, in the actual environment, there is a UE 100 that does not support the WLAN communication or a UE 100 in which the WLAN communication unit 112 is in an off state.

Thus, the UE 100 may transmit, to the eNB 200, a notification related to a WLAN communication capability of the UE 100 or a WLAN on/off state. The eNB 200 notifies the UE 100 of the preamble information, on the basis of the notification from the UE 100. Specifically, the eNB 200 transmits the preamble information only to the UE 100 which supports the WLAN communication and in which the WLAN communication unit 112 is in an on state.

Thus, the UE 100 transmits, to the eNB 200, a notification related to a WLAN communication capability of the UE 100 or a WLAN on/off state, and thereafter, receives the preamble information transmitted, on the basis of the notification, from the eNB 200. As a result, the UE 100 capable of connecting with the AP 300 is capable of acquiring the preamble information.

Other Embodiments

If the UE 100 that receives the preamble information does not intend to perform the offload to the AP 300, then a message to that effect may be notified to the eNB 200.

In the above-described embodiment, a case is assumed where the eNB 200 is a macro cell base station having a broad coverage; however, the eNB 200 may be a small cell base station having a coverage comparable to that of the AP 300. Further, when the eNB 200 is a small cell base station, the AP 300 may be collocated with the eNB 200.

In the above-described embodiments, as one example of the cellular communication system, the LTE system is described; however, the present invention is not limited to the LTE system, and the present invention may be applied to systems other than the LTE system.

In addition, the entire content of Japanese Patent Application No. 2013-100159 (filed on May 10, 2013) is incorporated in the present specification by reference.

INDUSTRIAL APPLICABILITY

According to the present invention, it is possible to avoid discontinuation of communication resulting from the contention of random access preambles, when a cellular communication system and a WLAN system are cooperated.

The invention claimed is:

1. A user terminal supporting cellular communication and wireless local area network (WLAN) communication, comprising:
   a receiver configured to receive, when a connection with a cellular base station is established by the user terminal, from the cellular base station, preamble information indicating a random access preamble to be used in a random access procedure when establishing again a connection with the cellular base station; and
   a controller configured to, after the connection with the cellular base station is established, establish a connection with a WLAN access point and release the connection with the cellular base station, wherein
   the controller is further configured to hold, without discarding, the preamble information after establishing the connection with the WLAN access point and releasing the connection with the cellular base station,
   the user terminal further comprises a transmitter configured to transmit, to the cellular base station, a notification related to a WLAN communication capability or a WLAN state of the user terminal, and the receiver receives the preamble information transmitted, on the basis of the notification, from the cellular base station.

2. The user terminal according to claim 1, wherein
the controller uses, when establishing a connection again with the cellular base station after releasing the connection with the cellular base station, the random access preamble indicated by the held preamble information to perform the random access procedure.

3. The user terminal according to claim 1, wherein
the user terminal is assigned, from the cellular base station, with the random access preamble different from that of another user terminal that establishes a connection with the cellular base station.

4. The user terminal according to claim 1, wherein
the user terminal is assigned, from the cellular base station, with the random access preamble different from that of another user terminal that establishes a connection with the WLAN access point.

5. The user terminal according to claim 1, wherein
the user terminal is assigned, from the cellular base station, with the random access preamble included in a contention-based random access preamble group.

6. The user terminal according to claim 1, wherein
the controller discards the held preamble information when a predetermined time passes since establishing a connection with the WLAN access point or when establishing a connection with a different cellular base station from the cellular base station.

7. The user terminal according to claim 1, wherein the preamble information is included in a connection instruction that is transmitted from the cellular base station and that instructs a connection to the WLAN access point.

8. A cellular base station establishing a connection with a user terminal, comprising:
a controller, communicatively coupled to a memory, the controller configured to notify, when a connection with the user terminal is established, the user terminal of preamble information indicating a random access preamble to be used in a random access procedure when the user terminal establishes again a connection with the cellular base station after releasing the connection with the cellular base station, wherein
the controller assigns the random access preamble differently for each user terminal that has established a connection with a same wireless local area network (WLAN) access point,
the base station further comprising a receiver configured to receive, from the user terminal, a notification related to a WLAN communication capability or a WLAN state of the user terminal, and
the controller notifies the user terminal of the preamble information, on the basis of the notification.

9. The cellular base station according to claim 8, wherein
the controller assigns the random access preamble differently for each user terminal that has established a connection with the cellular base station.

10. The cellular base station according to claim 8, wherein
the controller assigns the random access preamble included in a contention-based random access preamble group.

11. The cellular base station according to claim 8, wherein
the controller assigns the random access preamble included in a non-contention-based random access preamble group, and
the controller does not assign, to another user terminal, a random access preamble assigned to the user terminal but keeps the random access preamble assigned to the user terminal until a predetermined time passes since notifying the user terminal of the preamble information or a predetermined time passes since releasing the connection with the user terminal.

12. The cellular base station according to claim 8, wherein
the controller notifies the user terminal of the preamble information that is included in a connection instruction that instructs a connection to the WLAN access point.

13. A processor, communicatively coupled to a memory, the processor used in a user terminal supporting cellular communication and wireless local area network (WLAN) communication, configured to perform the steps of:
receiving, when a connection with a cellular base station is established by the user terminal, from the cellular base station, preamble information indicating a random access preamble to be used in a random access procedure when establishing again a connection with the cellular base station;
establishing a connection with a WLAN access point, after the connection with the cellular base station is established, and releasing the connection with the cellular base station;
holding, without discarding, the preamble information after establishing the connection with the WLAN access point and releasing the connection with the cellular base station; and
transmitting, to the cellular base station, a notification related to a WLAN communication capability or a WLAN state of the user terminal, wherein
the received preamble information is transmitted, on the basis of the notification, from the cellular base station.

* * * * *